(12) United States Patent
Rodriguez Bravo et al.

(10) Patent No.: US 12,242,594 B2
(45) Date of Patent: *Mar. 4, 2025

(54) UNIQUE PASSWORD POLICY CREATION

(71) Applicant: Kyndryl, Inc., New York, NY (US)

(72) Inventors: Cesar Augusto Rodriguez Bravo, Alajuela (CR); David Alonso Campos Batista, Aurora (CR); John Richard Feezell, Pikeville, TN (US); Faraz Ahmad, Noida (IN); Anto Ajay Raj John, Bangalore (IN)

(73) Assignee: Kyndryl, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,184

(22) Filed: Jan. 12, 2024

(65) Prior Publication Data

US 2024/0160718 A1 May 16, 2024

Related U.S. Application Data

(63) Continuation of application No. 17/411,376, filed on Aug. 25, 2021, now Pat. No. 11,914,698.

(51) Int. Cl.
*G06F 21/46* (2013.01)
*G06F 21/31* (2013.01)
*G06F 21/60* (2013.01)

(52) U.S. Cl.
CPC .............. *G06F 21/46* (2013.01); *G06F 21/31* (2013.01); *G06F 21/604* (2013.01)

(58) Field of Classification Search
CPC ......... G06F 21/46; G06F 21/31; G06F 21/604
See application file for complete search history.

(56) References Cited

U.S. PATENT DOCUMENTS

| | | | |
|---|---|---|---|
| 7,992,005 B2 | 8/2011 | Torres | |
| 8,332,918 B2 | 12/2012 | Vedula | |
| 8,893,001 B2* | 11/2014 | Nickell | ................... G06F 21/46 |
| | | | 715/708 |
| 9,798,872 B2* | 10/2017 | Shetty | ............... G06F 16/90344 |
| 10,331,879 B1 | 6/2019 | Jiang | |
| RE47,533 E * | 7/2019 | Bartlett | ................. H04W 12/71 |
| 11,494,482 B1* | 11/2022 | Mital | ................... H04L 63/166 |
| 2005/0114673 A1* | 5/2005 | Raikar | .................... G06F 21/46 |
| | | | 713/182 |

(Continued)

FOREIGN PATENT DOCUMENTS

| | | |
|---|---|---|
| WO | 2005106670 A1 | 11/2005 |
| WO | 2019006848 A1 | 1/2019 |

OTHER PUBLICATIONS

"Enforce Master Password requirements in 1Password Business", Published: Nov. 9, 2020, 3 pages, <https://support.1password.com/master-password-policy/>.

(Continued)

*Primary Examiner* — James R Turchen
(74) *Attorney, Agent, or Firm* — Erik Swanson; Andrew M. Calderon; Calderon Safran & Wright P.C.

(57) ABSTRACT

A random password policy for a specific user associated with an entity is generated based on a global password requirement. A new password created by the specific user based on the generated random password policy is identified. That the new password complies with a set of requirements specified by the generated random password policy is confirmed.

20 Claims, 4 Drawing Sheets

(56) References Cited

U.S. PATENT DOCUMENTS

| | | | | |
|---|---|---|---|---|
| 2007/0006301 | A1* | 1/2007 | Nickell | G06F 21/46 |
| | | | | 726/22 |
| 2009/0150677 | A1* | 6/2009 | Vedula | G06F 21/46 |
| | | | | 726/1 |
| 2009/0158406 | A1* | 6/2009 | Jancula | G06F 21/46 |
| | | | | 726/5 |
| 2009/0178106 | A1* | 7/2009 | Feng | H04L 63/20 |
| | | | | 726/1 |
| 2017/0308695 | A1* | 10/2017 | Adams | H04L 63/06 |
| 2019/0057210 | A1 | 2/2019 | Aelkatwad | |
| 2020/0322385 | A1* | 10/2020 | Bombacino | G06F 9/45558 |
| 2021/0279324 | A1* | 9/2021 | Orozco Cervantes | |
| | | | | H04L 9/3226 |

OTHER PUBLICATIONS

"How to create a fine-grained password policy in AD", Specops, Last updated on Feb. 7, 2020, 6 pages, <https://specopssoft.com/blog/create-fine-grained-password-policy-active-directory/>.

"Password policies at profile level", Copyright © 2019, 6 pages, <https://www.salesforcetutorial.com/password-polices-profile-level/>.

"Password Strength and Management for Common Criteria", Sep. 25, 2020, 7 pages.

Best, Jo, "Gates: The password is dead", Nov. 16, 2004, 3 pages, <https://www.zdnet.com/article/gates-the-password-is-dead/>.

Jose et al., "Improving the Security of Authentication With Dynamic Password Policy Through Keystroke and QR Code", Compliance Engineering Journal, vol. 10, Issue 11, 2019, 11 pages.

Kotadia, Munir, "Gates predicts death of the password", CNET, Feb. 25, 2004, 10 pages, <https://www.cnet.com/news/gates-predicts-death-of-the-password/>.

Shay et al., "Password Policy Simulation and Analysis", Copyright 2007 ACM, 10 pages, <https://dl.acm.org/doi/abs/10.1145/1314403.1314405>.

Singh et al., "Securing password using dynamic password policy generator algorithm", Accepted Jun. 9, 2019, 5 pages.

Spring, Tom, "Weak Bank Password Policies Leave 350 Million Vulnerable, Say Researchers", Mar. 3, 2016, 7 pages, <https://threatpost.com/weak-bank-password-policies-leave-350-million-vulnerable-say-researchers/116574/>.

Yang et al., "DPPG: A Dynamic Password Policy Generation System", (c) 2017 IEEE, 14 pages.

Zwinggi et al., "4 reasons why passwords are becoming a thing of the past", Jan. 21, 2020, 5 pages.

List of KYNDRYL Patents or Patent Applications Treated as Related, dated Jan. 12, 2024, 2 pages.

* cited by examiner

UNIQUE PASSWORD POLICY CREATION

BACKGROUND

The present invention relates generally to the field of password policies, and more particularly to creating unique password policies on an individual, user-by-user basis.

Cybersecurity experts consider strong passwords the first line of defense for keeping private information secure. An individual will use a strong password to prevent unauthorized access to a bank account in the same manner that a company utilizes strong passwords to stop illegal/unlawful access to proprietary data. In the past, a normal password requirement was six characters in length. Then six characters became eight characters. Today, twelve character passwords are considered a minimum requirement by many experts as solving (i.e., hacking) passwords has become more sophisticated over the years.

SUMMARY OF THE INVENTION

Embodiments of the present invention include an approach for creating unique password policies on an individual, user-by-user basis. In one embodiment, a random password policy for a specific user associated with an entity is generated based on a global password requirement. A new password created by the specific user based on the generated random password policy is identified. That the new password complies with a set of requirements specified by the generated random password policy is confirmed.

DETAILED DESCRIPTION

Figure 1:
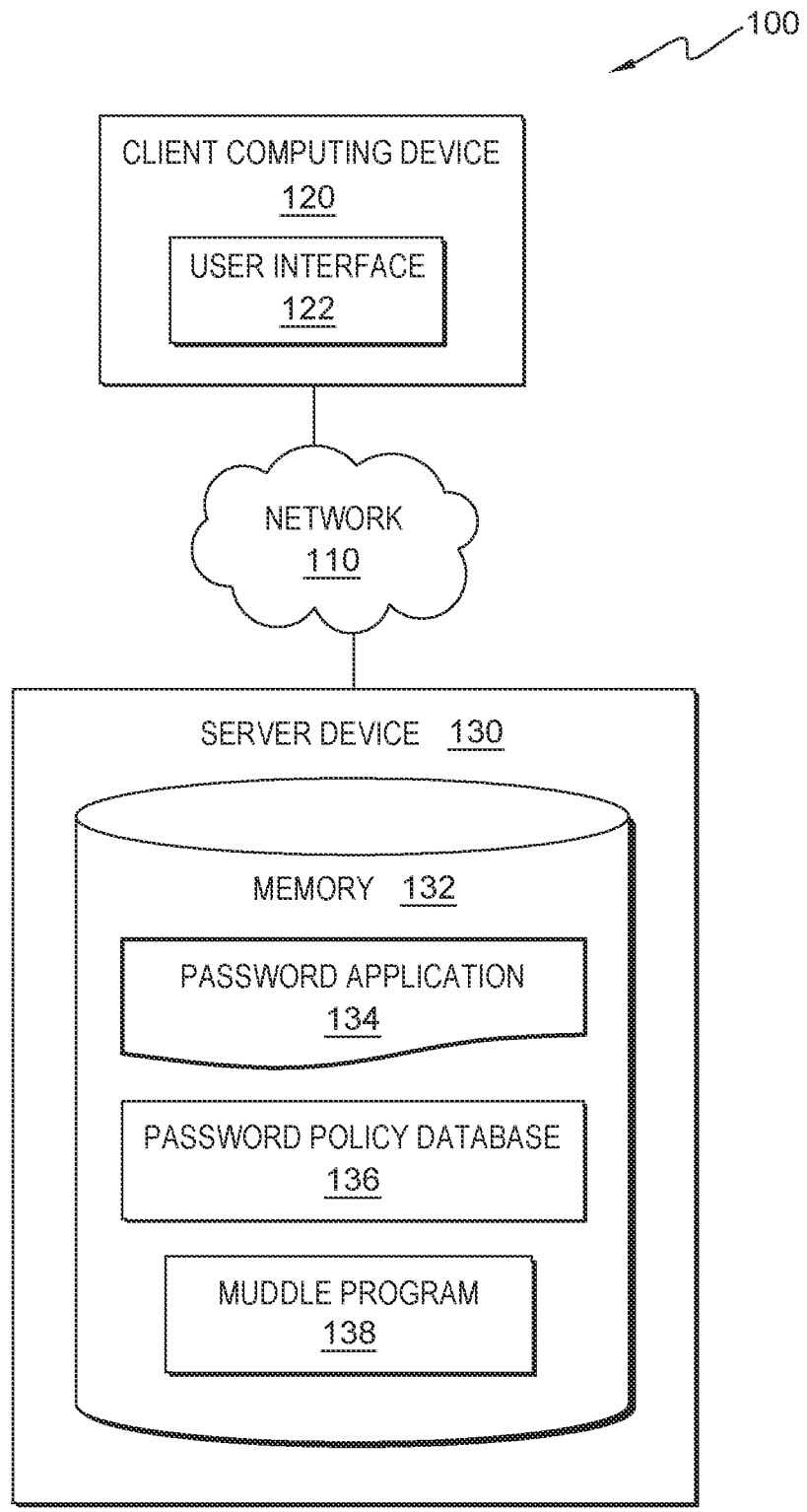
FIG. 1 depicts a functional block diagram of a computing environment, in accordance with an embodiment of the present invention.

Embodiments of the present invention recognize that strong passwords are an important part of cybersecurity. An application on the Internet (e.g., a banking application) and a corporation may each have specific password criteria that a user must comply with when creating a password. Examples of password criteria include, but are not limited to, (i) a number of characters (e.g., six, eight, twelve, etc.); (ii) use of both upper and lowercase letters (e.g., 'a, b, c, . . . ' and 'A, B, C, . . . '); and (iii) inclusion of letters, numbers (e.g., '0-9'), and certain special characters (e.g., '!', '#', '&', '*', etc.) in the password. Hackers today have access to sophisticated computing devices able to 'brute force' attack passwords and resolve them for nefarious reasons. The more complex the password, the longer the attack. But long passwords may not be sufficient, especially if everyone is using the same password policy which is readily available to anyone looking for it (e.g., anyone can download a banking application and start the process of registering to use said application; the password policy for that banking application will be provided as part of the registration process).

Embodiments of the present invention recognize that there may be a method, computer program product, and computer system for creating unique password policies on an individual, user-by-user basis. In an embodiment, the method, computer program product, and computer system creates a random password policy for each user based on a global policy applicable to all of the users. The technology of cybersecurity is improved via the method, computer program product, and computer system because embodiments of the present invention can generate random password policies that vary in length and criteria, for respective devices connecting to or otherwise accessing an application, network, etc. In this manner, embodiments of the present invention increases security of such applications because each user of an application follows different security policies. This makes brute force attacks to "guess" the password for a user in a group of users of an application more difficult since each user of the group does not necessarily follow the same password policy. For example, if a global password requirement for accessing electronic medical records comprises a password eight to twelve characters in length with use of lowercase letter, uppercase letters, numbers, and a defined set of special characters, the present invention may assign user 'A' a password criteria of a password ten characters long with three uppercase letters, two numbers, and one special character while user 'B' may be assigned password criteria of a password eight characters long with one uppercase letter, four numbers, and two special characters.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client computing device 120 and server device 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with client computing device 120 and server device 130 over network 110

According to embodiments of the present invention, client computing device 120 and server device 130 are connected to network 110, which enables client computing device 120 and server device 130 to access other computing devices and/or data not directly stored on client computing device 120 and server device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between client computing device 120 and server device 130, and any other computing devices (not shown in FIG. 1) connected to network 110, in accordance with embodiments of the present invention. In an embodiment, data received by another computing device (not shown in FIG. 1) in computing environment 100 is communicated to client computing device 120 and server device 130 via network 110.

In an embodiment of the present invention, client computing device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client computing device 120 can be a standalone computing device, a management server, a web server, a mobile computing device, or any other electronic device or computing system capable of receiving, transmitting, and processing data. In other embodiments, client computing device 120 can represent computing systems utilizing multiple computers as a server system, such as in a cloud computing environment. In certain embodiments, client computing device 120 represents a computer system utilizing clustered computers and components (e.g., database server computers, application server computers, etc.) that act as a single pool of seamless resources when accessed by elements of computing environment 100. In general, client computing device 120 is representative of any electronic device or combination of electronic devices capable of executing computer readable program instructions. In an embodiment, computing environment 100 includes any number of client computing device 120. Client computing device 120 may include internal and external hardware components as depicted and described in further detail with respect to FIG. 3, in accordance with embodiments of the present invention. Client computing device 120 may also include user interface (UI) 122.

According to an embodiment of the present invention, user interface 122 provides an interface between client computing device 120 and server device 130. User interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 may also be mobile application software that provides an interface between client computing device 120 and server device 130. Mobile application software, or an "app," is a computer program designed to run on smartphones, tablet computers and other mobile devices.

User interface 122 enables a user of client computing device 120 to interact with server device 130 (e.g., requesting a database query), and other computing devices not shown in FIG. 1.

In embodiments of the present invention, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. In an embodiment, computing environment 100 includes any number of server device 130. Server device 130 may include internal and external hardware components as depicted and described in further detail with respect to FIG. 3, in accordance with embodiments of the present invention. Server device 130 may also include memory 132.

According to an embodiment of the present invention, memory 132 is storage that is written to and/or read by muddle program 138, and any other programs and applications on client computing device 120 and server device 130. In one embodiment, memory 132 resides on server device 130. In other embodiments, memory 132 resides on client computing device 120, on any other device (not shown) in computing environment 100, in cloud storage, or on another computing device accessible via network 110. In yet another embodiment, memory 132 represents multiple storage devices within server device 130. Memory 132 may be implemented using any volatile or non-volatile storage media for storing information, as known in the art. For example, memory 132 may be implemented with a tape library, optical library, one or more independent hard disk drives, multiple hard disk drives in a redundant array of independent disks (RAID), solid-state drives (SSD), or random-access memory (RAM). Similarly, memory 132 may be implemented with any suitable storage architecture known in the art, such as a relational database, an object-oriented database, or one or more tables. In an embodiment of the present invention, muddle program 138, and any other programs and applications (not shown in FIG. 1) operating on client computing device 120 and server device 130 may store, read, modify, or write data to memory 132. In an embodiment of the present invention, data stored to memory 132 includes, but is not limited to, password application 134, password policy database, and muddle program 138.

In an embodiment, password application 134 is an application for creating a password using one of (i) a global password requirement required by an organization, application, operating system, etc. and (ii) a random password policy. In one embodiment, password application 134 creates a password strictly following the global password requirement. For example, if the password criteria must be the same for all users, passwords for said users will be created by password application 134. According to the embodiment, password application 134 is used when a new user is on-boarding at a company and said user requires one or more initial (or default) passwords to gain access to company systems and databases. In another embodiment, password application 134 is used by a user to create a user-selected password that meets a random password policy associated with said user.

According to an embodiment of the present invention, password policy database 136 is a memory location where the global password requirement for an entity (e.g., an organization, a company, an application, a computing device, an operating system, etc.) and random password policies associated with individual users are stored. In an embodiment, the global password requirement defines the minimum password requirements mandated by the entity (e.g., a password must be at least eight characters long and must include three of the following: a lowercase letter, an uppercase letter, a number, and a special character). The global password requirement is utilized by password application 134 when password application 134 creates an initial password for a user. Muddle program 138 retrieves the global password requirement from password policy database 136 when generating a random password policy for a user that is creating a new password.

In an embodiment, muddle program 138 can be a program, a subprogram of a larger program, an application, a plurality of applications, or mobile application software, which functions to create unique password policies on an individual, user-by-user basis. A program is a sequence of instructions written by a programmer to perform a specific task. In an embodiment, muddle program 138 runs by itself. In other embodiments, muddle program 138 depends on system software (not shown in FIG. 1) to execute. In one embodiment, muddle program 138 functions as a stand-alone program residing on server device 130 in memory 132. In another embodiment, muddle program 138 works in conjunction with other programs, applications, etc., found in computing environment 100. In yet another embodiment, muddle program 138 resides on client device 120. In yet another embodiment, muddle program 138 resides on other computing devices (not shown in FIG. 1) in computing environment 100, which are interconnected to client device 120 and server device 130 via network 110.

According to an embodiment, muddle program 138 receives an indication of a user creating a password. In the embodiment, muddle program 138 retrieves the global password requirement (i.e., the governing password policy for the organization, application, etc.). Further in the embodiment, muddle program 138 generates a random password policy for the user based on the retrieved global password requirement. Further yet in the embodiment, muddle program 138 stores the generated random policy and associated said random policy with the user. Further yet in the embodiment, muddle program 138 implements the stored random policy across all of the domains utilized by the user. Further yet in the embodiment, muddle program 138 transmits the stored random policy to the user. Further yet in the embodiment, muddle program 138 identifies the new password created by the user. Further yet in the embodiment, muddle program 138 confirms the identified password against the stored random policy for compliance.

Figure 2A:
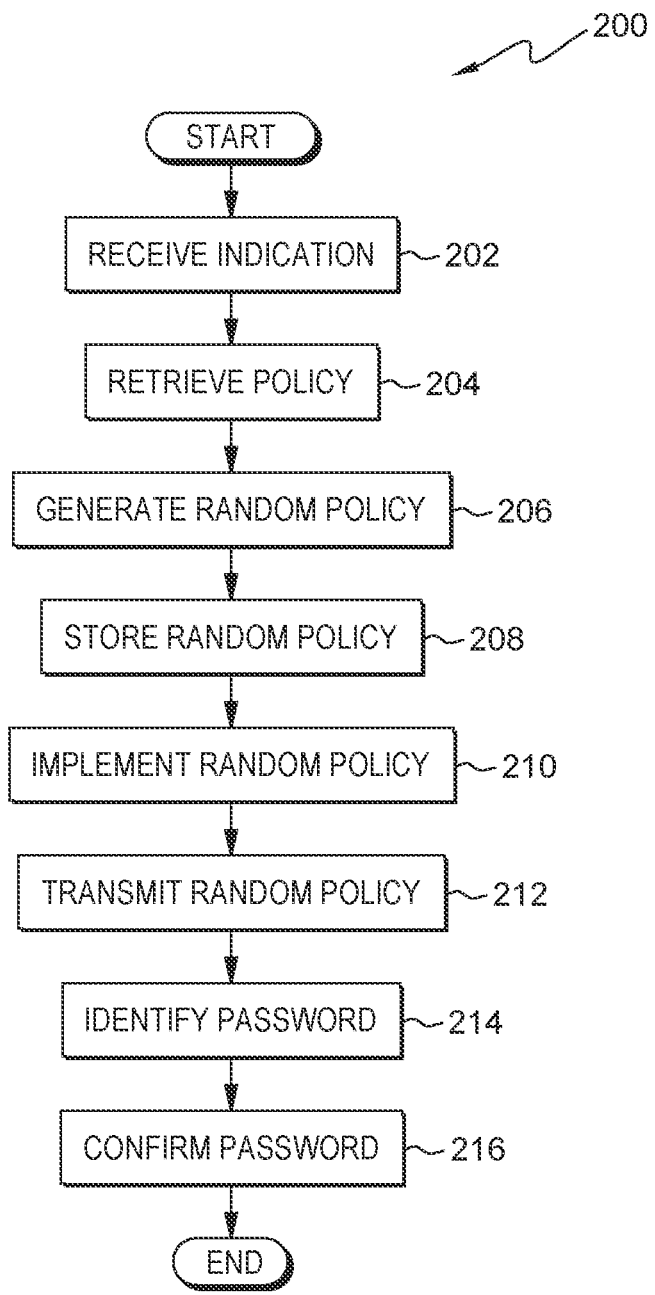
FIG. 2A depicts a flowchart of a program for creating unique password policies on an individual, user-by-user basis, in accordance with an embodiment of the present invention.

FIG. 2A is a flowchart of workflow 200 depicting a method for creating unique password policies on an individual basis. In one embodiment, the method of workflow 200 is performed by muddle program 138. In an alternative embodiment, the method of workflow 200 is performed by any other program (e.g., password application 134) working with muddle program 138. In an embodiment, a user, via user interface 122, invokes workflow 200 upon indicating an intent to change a default password. In an alternative embodiment, a user invokes workflow 200 upon accessing muddle program 138 on server device 130 via network 110.

In an embodiment, muddle program 138 receives an indication (step 202). In other words, muddle program 138 receives an indication of a user creating a password to be utilized by the user or changing a default password provided by password application 134; in both instances, the user does not have an associated random password policy assigned. According to an embodiment, responsive to the user starting the process of either creating a password or changing a password, muddle program 138 receives the indication from the computing device of the user over network 110. In an embodiment, muddle program 138 on server device 130 receives an indication over network 110 from client computing device 120 that a user associated with client computing device 120 is changing a default password. For example, a program on a company server receives a first indication over the company's wired network from a laptop computer associated with Bill that Bill is changing two default passwords (said default passwords were provided to Bill earlier in the day as Bill is a new hire at the company). Further, the program receives a second indication from a desktop computer associated with new hire Ted as Ted is also changing two default passwords.

According to an embodiment, muddle program 138 retrieves policy (step 204). In other words, muddle program 138 retrieves the global password requirement for an entity. In an embodiment, muddle program 138 retrieves the global password requirement from an available memory such as a policy database. The policy database may be local to muddle program 138 (e.g., on server device 130) or may be remote to muddle program 138 (e.g., on client computing device 120). The global password requirement defines the minimum password requirements mandated by the entity (e.g., an organization, a company, an Internet website, an operating system, and any other body or individual that defines password criteria). According to an embodiment of the present invention, muddle program 138 retrieves the global password requirement from password policy database 136 on server device 130. For example, the program on the company server retrieves the global password requirement mandated by the company from a policy database residing on the same company server.

In an embodiment, muddle program 138 generates a random policy (step 206). In other words, muddle program 138 generates a random password policy for a user based on the retrieved global password requirement. According to an embodiment, muddle program 138 generates the random password policy such that a created password that meets the requirements of the random password policy also meets the requirements of the global password requirement (i.e., the generated random password policy is a subset of the global password requirement). Thus, the generated random password policy can be equivalent to the global password requirement or the generated random password policy can be "less" than the global password requirement (e.g., if the global password requirement requires eight to twelve characters in a password, the random password policy will also require eight to twelve characters (not less than eight or more than twelve) and if the global password requirement requires using at least one of four special characters, the random password policy will not indicate five special characters to select from). In an embodiment, muddle program 138 generates a random password policy based on the retrieved global password requirement. For example, the program on the company server generates a first random password policy to be used by Bill, and a second random password policy to be used by Ted, from the retrieved global password requirement for the company. In the example, the global password requirement is that a password must be at least six characters in length, must include both lower and uppercase letters, must include up to four numbers, and must include at least one special character selected from the following group of special characters: '@'; '#'; '$'; '%'; and '*'. Based on this global password requirement, the generated random password policy for Bill ('PW-B') is that a password must be at least ten characters in length, must include at least two lowercase and two uppercase letters, must include only one number, and must include two special characters from the group. The generated random password policy for Ted ('PW-T') is that a password must be exactly eight characters in length, must include only one lowercase letter and one uppercase letter, must include three numbers, and must include three special characters.

According to an embodiment of the present invention, muddle program 138 stores the random policy (step 208). In other words, muddle program 138 stores the generated random password policy to a storage location; further, muddle program 138 creates and stores an association between said password policy (or policies) and the user (or users) for whom it was generated. In an embodiment, muddle program 138 stores the generated random policy to a local storage, or to a remote storage accessible via an available network. Each generated random policy is associated with a specific user via an identification of the user (e.g., a username, an e-mail address, an employee number, an Internet protocol (IP) address, etc.). According to an embodiment, muddle program 138 stores the generated random password policy, associated with a user, to password policy database 136 in memory 132 on server device 130. For example, the program on the company server stores 'PW-B' and 'PW-T' to a policy database on the server.

In an embodiment, muddle program 138 implements the random policy (step 210). In other words, muddle program 138 implements the generated random password policy associated with the user across all of the domains utilized by the user based on the created association. According to the embodiment, once implemented, the user will have the same password policy for any domain (e.g., application, program, computing device, database, etc.) used by the entity that requires a password for access. Thus, the same random password policy for a specific user is applicable for the user's e-mail program, the user's access to company databases, the user's access to applications written for the company, the user's access to electronic meeting software, and the like. In an embodiment, muddle program 138 implements the generated random password policy across the company domains utilized by the user based on the created association between the generated random password policy and the user. For example, the program on the company server implements Bill's generated random password policy ('PW-B') on the company e-mail program and on the company's safety database (as Bill is a safety technician). Further, the program implements Ted's generated random password policy ('PW-T') on the company e-mail program and on the company's human resources (HR) database (as Ted is an HR associate).

According to an embodiment, muddle program 138 transmits the random policy (step 212). In other words, muddle program 138 transmits the generated random password policy to the user. In an embodiment, muddle program 138 uses any technique known in the art for transmitting the generated random password policy. For example, muddle program 138 can use an e-mail, a voicemail, a test message, or any other form of communication known in the art to transmit the generated random password policy to the user. According to an embodiment of the present invention, muddle program 138 transmits the generated random password policy over network 110 in an e-mail to the user of client computing device 120; said policy is viewed by said user via user interface 122. For example, the program on the company server transmits, via e-mail, 'PW-B' to Bill and 'PW-T' to Ted; Bill accesses the e-mail on his laptop computer and Ted accesses the e-mail on his desktop computer. Based on the transmitted policies, both Bill and Ted create new passwords. In the example, Bill creates the following password (which meets the requirements of the 'PW-B' random password policy): 'aB5aB@CthreePo*' and Ted creates the following password (which meets the requirements of the 'PW-T' random password policy): 'xY9%8$7#'.

In an embodiment, muddle program 138 identifies a password (step 214). In other words, muddle program 138 identifies a new (or updated) password associated with the user (subsequent to the user creating a password based on the generated random password policy received from muddle program 138). According to an embodiment, muddle program 138 identifies the password based on the user's utilization of password application 134 (used to create the new password which meets the user's random password policy). Muddle program 138 stores the identified password and associates said password with the user. The stored password is used to (i) confirm that said password meets the random password policy and (ii) verify that the user does not use the same password in the future. In an embodiment, muddle program 138 identifies a password associated with the user of client computing device 120 and stores said password with the association. For example, the program on the company server identifies the new password created by Bill (i.e., 'aB5aB@CthreePo*') and the new password created by Ted (i.e., 'xY9%8$7#'); the new passwords are stored and associated with Bill and Ted, respectively.

According to an embodiment of the present invention, muddle program 138 confirms a password (step 216). In other words, muddle program 138 confirms that the identified password associated with the user complies with the generated random password policy. In an embodiment, muddle program 138 compares the identified password associated with a specific user to the specific user's random password policy. In the embodiment, if the identified password meets the criteria of the user's random password policy, muddle program 138 ends. If the identified password does not meet the criteria (i.e., fails to comply with the criteria), the user is notified (e.g., a notification is transmitted to the user indicating that the password does not meet the criteria), the error in the new password (e.g., (i) you must use two special characters and your password only used one, or (ii) your password must be at least ten characters in length and your password is only nine characters) is provided to the user, and the user is informed to create another password following the random password policy. According to an embodiment, muddle program 138 confirms that the identified password meets the requirements of the random password policy associated with the user. For example, the program on the company server confirms that Bill's new password meets the 'PW-B' random password policy and further confirms that Ted's new password meets the 'PW-T' random password policy.

According to another embodiment of the present invention, muddle program 138 receives a request to change a password for a user. In the embodiment, muddle program 138 retrieves the random password policy associated with the user. Further in the embodiment, muddle program 138 transmits the retrieved random policy to the user. Further yet in the embodiment, muddle program 138 identifies the new password created by the user. Further yet in the embodiment, muddle program 138 confirms the identified password for compliance against the random password policy associated with the user.

Figure 2B:
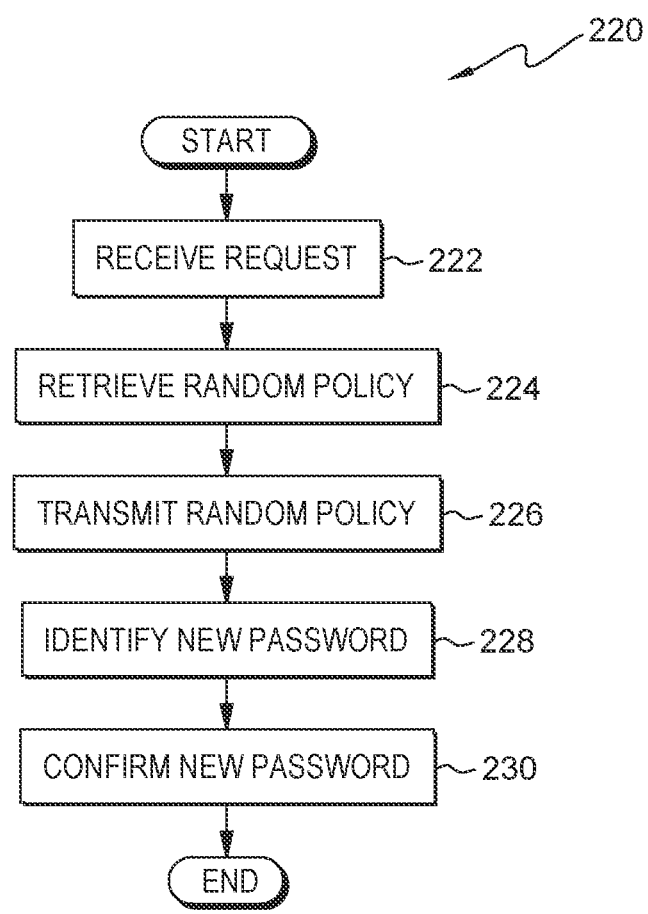
FIG. 2B depicts a flowchart of a program for updating a password of a user based on a unique password policy associated with the user, in accordance with an embodiment of the present invention.

FIG. 2B is a flowchart of workflow 220 depicting a method for updating a password of a user based on a random password policy associated with the user. In one embodiment, the method of workflow 220 is performed by muddle program 138. In an alternative embodiment, the method of workflow 220 is performed by any other program (e.g., password application 134) working with muddle program 138. In an embodiment, a user, via user interface 122, invokes workflow 220 upon updating a password. In an alternative embodiment, a user invokes workflow 220 upon accessing muddle program 138 on server device 130 via network 110.

According to an embodiment, muddle program 138 receives a request (step 222). In other words, muddle program 138 receives a request from password application 134 indicating that a user that is changing a user-created password (as opposed to a default password created by password application 134; e.g., for a new hire employee). In an embodiment, muddle program 138 also receives an identification of the user along with the request for the password change. The request is received by muddle program 138 from a computing device associated with the user via an available network. In one embodiment, a password change for one domain results in a password change for all of the other pertinent domains associated with the user. In another embodiment, a password change for a specific domain only changes the password associated with accessing said specific domain According to an embodiment of the present invention, muddle program 138 receives a request via network 110 from client computing device 120 that the user of client computing device 120 is changing a password. For example, the program on the company server receives a request from a password application indicating that Ted is changing a password for accessing the HR database. Because of privacy concerns, the password for accessing the HR database must be changed every three months while the password for the safety database (associated with Bill) must be change every six months and a password for the company e-mail program must be changed annually. However, by changing the password for the HR database, Ted's password for the e-mail program will also be changed/updated.

In an embodiment, muddle program 138 retrieves the random policy (step 224). In other words, muddle program 138 retrieves the previously generated random password policy associated with the user. According to an embodiment, muddle program 138 retrieves the generated random password policy from an available memory such as a policy database. The policy database may be local to muddle program 138 (e.g., on server device 130) or may be remote to muddle program 138 (e.g., on client computing device 120). The generated random password policy defines the user-specific password policy that a user is required to utilize. In an embodiment, muddle program 138 retrieves the generated random password policy from password policy database 136 on server device 130. For example, the program on the company server retrieves the generated random password policy associated with Ted from a policy database residing on the same company server.

According to an embodiment, muddle program 138 transmits the random policy (step 226). In other words, muddle program 138 transmits the retrieved random password policy, previously generated for the user, to the user. In an embodiment, muddle program 138 uses any technique known in the art for transmitting the retrieved random password policy. For example, muddle program 138 can use an e-mail, a voicemail, a test message, or any other form of communication known in the art to transmit the retrieved random password policy to the user. According to an embodiment of the present invention, muddle program 138 transmits the retrieved random password policy over network 110 in an e-mail to the user of client computing device 120; said policy is viewed by said user via user interface 122. For example, the program on the company server transmits, via e-mail, 'PW-T' to Ted and Ted accesses said e-mail on his desktop computer. Based on the transmitted policy, Ted creates a new password for accessing the HR database. In the example, Ted creates the following password (which meets the requirements of the 'PW-T' random password policy): 'j4*7#5@P' (which differs from Bill's previous password of 'xY9%8$7#').

In an embodiment, muddle program 138 identifies a new password (step 228). In other words, muddle program 138 identifies an updated password associated with the user (subsequent to the user updating the password based on the transmitted random password policy the user received from muddle program 138). According to an embodiment, muddle program 138 identifies the password based on the user's utilization of password application 134 (used to update the previous password which meets the user's random password policy). Muddle program 138 stores the identified updated password and associates said password with the user. The stored password is used to (i) confirm that said password meets the random password policy and (ii) verify that the user does not use the same password in the future. In an embodiment, muddle program 138 identifies a password associated with the user of client computing device 120 and stores said password with the association. For example, the program on the company server identifies the new password created by Ted (i.e., 'j4*7#5@P'); the updated password is stored and associated Ted.

According to an embodiment, muddle program 138 confirms the new password (step 230). In other words, muddle program 138 confirms that the identified password associated with the user complies with the random password policy. In an embodiment, muddle program 138 compares the identified password associated with a specific user to the specific user's random password policy. In the embodiment, if the identified password meets the criteria of the user's random password policy, muddle program 138 ends. If the identified password does not meet the criteria (i.e., fails to comply with the criteria), the user is notified (e.g., a notification is transmitted to the user indicating that the password does not meet the criteria), the error in the new password (e.g., (i) you must both upper and lowercase letters and your password only uses lowercase, or (ii) your password must be between six and twelve characters in length and your password is five characters) is provided to the user, and the user is informed to create another password following the random password policy. According to an embodiment, muddle program 138 confirms that the identified password meets the requirements of the random password policy associated with the user. For example, the program on the company server confirms that that Ted's new password meets the 'PW-T' random password policy.

Figure 3:
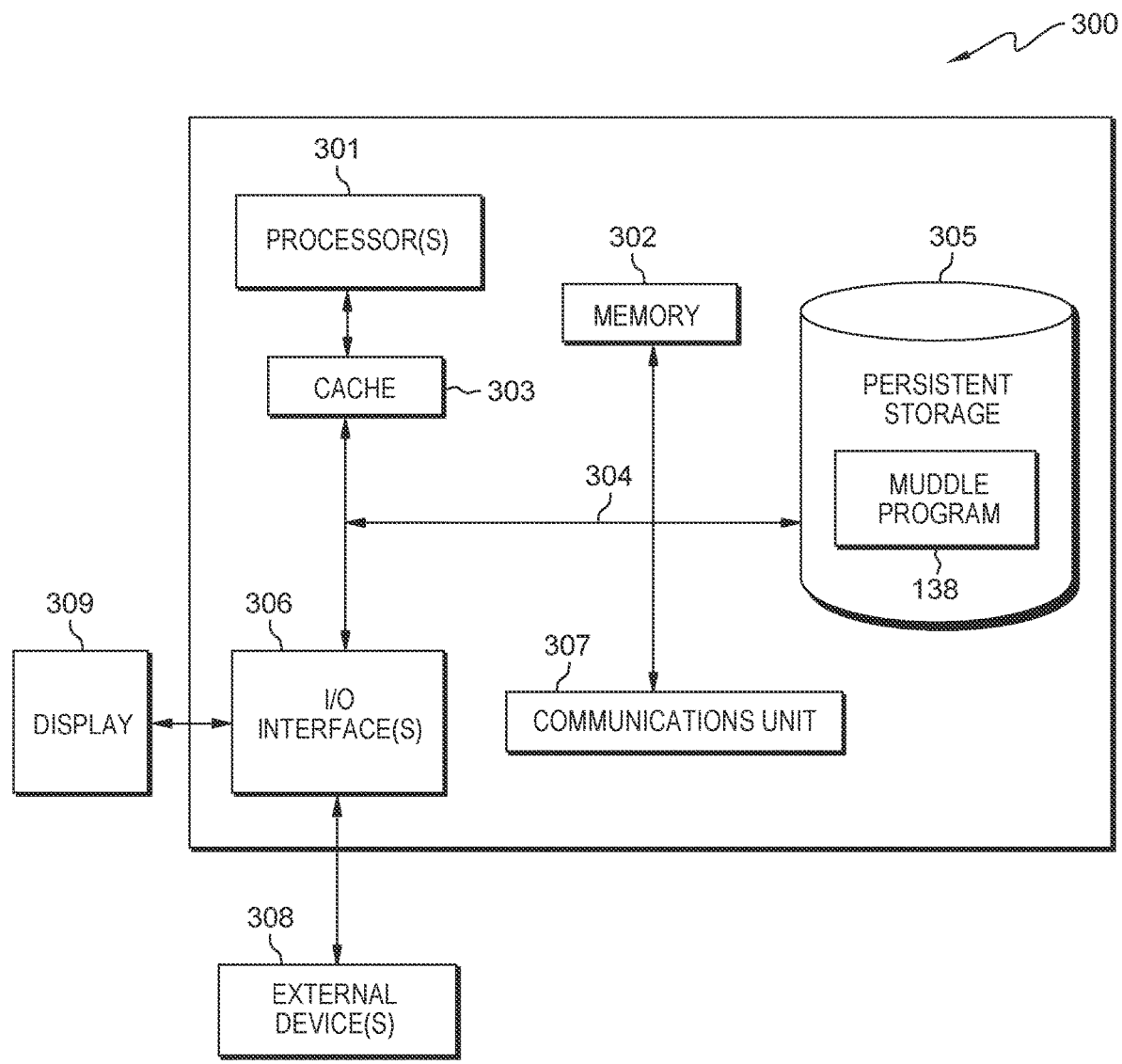
FIG. 3 depicts a block diagram of components of the computing environment of FIG. 1, in accordance with an embodiment of the present invention.

FIG. 3 depicts computer system 300, which is an example of a system that includes muddle program 138. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    generating, by the one or more computer processors, a random password policy for a specific user associated with an entity based on a global password requirement, wherein the global password requirement defines minimum password requirements mandated by the entity for all users associated with the entity, and the random password policy is a subset of the global password requirement;
    identifying, by the one or more computer processors, a new password created by the specific user based on the generated random password policy;
    confirming, by the one or more computer processors, that the new password complies with a set of requirements specified by the generated random password policy; and
    implementing, by the one or more computer processors, the generated random password policy for the specific user across all entity domains utilized by the specific user.

2. The method of claim 1, wherein the step of generating, by one or more computer processors, a random password policy for a specific user associated with an entity based on a global password requirement, comprises:
    receiving, by the one or more computer processors, at least one of a first indication of the specific user creating a new password and a second indication of the specific user changing a default password,
    wherein the entity is selected from the group consisting of an organization, a company, an Internet website, and an operating system; and
    generating, by the one or more computer processors, the random password policy for the specific user associated with the entity based on the global password requirement.

3. The method of claim 1, further comprising:
    storing, by the one or more computer processors, the generated random password policy for the specific user to an available memory;
    creating, by the one or more computer processors, an association between the generated random password policy and the specific user, wherein the created association is also stored to the available memory; and
    transmitting, by the one or more computer processors, the generated random password policy to the specific user.

4. The method of claim 1, wherein responsive to confirming that the new password fails to comply with the set of requirements specified by the generated random password policy:
    a notification is transmitted to the specific user indicating that the new password fails to comply with the set of requirements;
    one or more errors in the new password are provided to the specific user in the notification; and
    the specific user is informed via the notification to create another new password which meets the set of requirements.

5. The method of claim 1, further comprising:
receiving, by the one or more computer processors, a request from the specific user that the specific user is changing a first password created by the specific user;
identifying, by the one or more computer processors, a new password resulting from the specific user changing the first password; and
confirming, by the one or more computer processors, that the identified new password complies with the random password policy associated with the specific user.

6. The method of claim 5, wherein the step of confirming, by one or more computer processors, that the identified new password complies with the random password policy associated with the specific user, comprises:
identifying, by the one or more computer processors, the specific user based on the received request;
retrieving, by the one or more computer processors, the random password policy associated with the identified specific user;
transmitting, by the one or more computer processors, the retrieved random password policy to the identified specific user; and
confirming, by the one or more computer processors, that the identified new password complies with the transmitted random password policy associated with the specific user.

7. The method of claim 6, wherein the received request includes an identification of the specific user.

8. A computer program product, the computer program product comprising:
one or more computer readable storage media; and
program instructions stored on the one or more computer readable storage media, the program instructions comprising:
program instructions to generate a random password policy for a specific user associated with an entity based on a global password requirement, wherein the global password requirement defines minimum password requirements mandated by the entity for all users associated with the entity and the random password policy must meet at least the global password requirement;
program instructions to identify a new password created by the specific user based on the generated random password policy;
program instructions to confirm that the new password complies with a set of requirements specified by the generated random password policy; and
program instructions to implement the generated random password policy across plural domains of the entity utilized by the specific user.

9. The computer program product of claim 8, wherein the program instructions to generate a random password policy for a specific user associated with an entity based on a global password requirement, comprises:
program instructions to receive at least one of a first indication of the specific user creating a new password and a second indication of the specific user changing a default password,
wherein the entity is selected from the group consisting of an organization, a company, an Internet website, and an operating system; and
program instructions to generate the random password policy for the specific user associated with the entity based on the global password requirement.

10. The computer program product of claim 8, further comprising program instructions stored on the one or more computer readable storage media, to:
store the generated random password policy for the specific user to an available memory;
create an association between the generated random password policy and the specific user, wherein the created association is also stored to the available memory; and
transmit the generated random password policy to the specific user.

11. The computer program product of claim 8, wherein responsive to confirming that the new password fails to comply with the set of requirements specified by the generated random password policy:
a notification is transmitted to the specific user indicating that the new password fails to comply with the set of requirements;
one or more errors in the new password are provided to the specific user in the notification; and
the specific user is informed via the notification to create another new password which meets the set of requirements.

12. The computer program product of claim 8, further comprising program instructions stored on the one or more computer readable storage media, to:
receive a request from the specific user that the specific user is changing a first password created by the specific user;
identify a new password resulting from the specific user changing the first password; and
confirm that the identified new password complies with the random password policy associated with the specific user.

13. The computer program product of claim 12, wherein the program instructions to confirm that the identified new password complies with the random password policy associated with the specific user, comprises:
program instructions to identify the specific user based on the received request;
program instructions to retrieve the random password policy associated with the identified specific user;
program instructions to transmit the retrieved random password policy to the identified specific user; and
program instructions to confirm that the identified new password complies with the transmitted random password policy associated with the specific user.

14. The computer program product of claim 13, wherein the received request includes an identification of the specific user.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to generate a random password policy for a specific user associated with an entity based on a global password requirement, wherein the global password requirement defines minimum password requirements mandated by the entity for all users associated with the entity and the random password policy must meet at least the global password requirement;
program instructions to identify a new password created by the specific user based on the generated random password policy;

program instructions to confirm that the new password complies with a set of requirements specified by the generated random password policy; and program instructions to implement the generated random password policy across plural domains of the entity utilized by the specific user.

16. The computer system of claim 15, wherein the program instructions to generate a random password policy for a specific user associated with an entity based on a global password requirement, comprises:

program instructions to receive at least one of a first indication of the specific user creating a new password and a second indication of the specific user changing a default password, wherein the entity is selected from the group consisting of an organization, a company, an Internet website, and an operating system; and program instructions to generate the random password policy for the specific user associated with the entity based on the global password requirement.

17. The computer system of claim 15, further comprising program instructions stored on the one or more computer readable storage media for execution by at least one of the one or more computer processors, to:

store the generated random password policy for the specific user to an available memory;

create an association between the generated random password policy and the specific user, wherein the created association is also stored to the available memory;

transmit the generated random password policy to the specific user.

18. The computer system of claim 15, wherein responsive to confirming that the new password fails to comply with the set of requirements specified by the generated random password policy:

a notification is transmitted to the specific user indicating that the new password fails to comply with the set of requirements;

one or more errors in the new password are provided to the specific user in the notification; and the specific user is informed via the notification to create another new password which meets the set of requirements.

19. The computer system of claim 15, further comprising program instructions stored on the one or more computer readable storage media for execution by at least one of the one or more computer processors, to:

receive a request from specific user that the specific user is changing a first password created by the specific user;

identify a new password resulting from the specific user changing the first password; and confirm that the identified new password complies with the random password policy associated with the specific user.

20. The computer system of claim 19, wherein the program instructions to confirm that the identified new password complies with the random password policy associated with the specific user, comprises:

program instructions to identify the specific user based on the received request;

program instructions to retrieve the random password policy associated with the identified specific user;

program instructions to transmit the retrieved random password policy to the identified specific user; and program instructions to confirm that the identified new password complies with the transmitted random password policy associated with the specific user.

* * * * *